(12) United States Patent
Horino et al.

(10) Patent No.: US 6,219,472 B1
(45) Date of Patent: Apr. 17, 2001

(54) OPTICAL SWITCH, METHOD OF MANUFACTURING SAME, AND OPTICAL COMMUNICATION EQUIPMENT USING THE SAME

(75) Inventors: Masaya Horino, Ibaraki-ken; Kazutaka Sato, Kashiwa; Teruhisa Akashi, Abiko; Masaru Muranishi, Ibaraki-ken; Norifumi Komatsu, Kamakura; Dai Kobayashi; Hiroaki Okano, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/018,958

(22) Filed: Feb. 5, 1998

(30) Foreign Application Priority Data

Feb. 17, 1997 (JP) .................................................. 9-031723

(51) Int. Cl.$^7$ ....................................................... G02B 6/00
(52) U.S. Cl. .............................. 385/16; 385/21; 359/320
(58) Field of Search ................................. 385/16, 20, 22, 385/21, 59; 359/320

(56) References Cited

U.S. PATENT DOCUMENTS

| 5,071,217 | * | 12/1991 | Birch ........................................ 385/33 |
| 5,078,514 | * | 1/1992 | Valette et al. ........................... 385/20 |
| 5,905,829 | * | 5/1999 | Maenishi et al. ....................... 385/59 |

FOREIGN PATENT DOCUMENTS

| 0 476 241 A2 | 3/1992 | (EP) . |
| 0 712 004 A1 | 5/1996 | (EP) . |
| 59-22002 | 2/1984 | (JP) . |
| 6-148536 | 5/1994 | (JP) . |
| 61-48536 | 5/1994 | (JP) . |
| 10-161046 | 6/1998 | (JP) . |
| WO88/07697 | 10/1988 | (WO) . |
| WO91/05284 | 4/1991 | (WO) . |
| WO 97/28476 | 8/1997 | (WO) . |

* cited by examiner

Primary Examiner—Rodney Bovernick
Assistant Examiner—Ellen Kim
(74) Attorney, Agent, or Firm—Antonelli, Terry, Stout, Kraus, LLP

(57) ABSTRACT

An optical switch for switching an optical path of an input optical signal comprises a substrate composed of a silica glass substrate, a separation layer formed on the silica glass substrate, a plurality of cantilever beams and formed in parallel to one another on the separation layer and connected at their tip ends to a connection member, at least one silica glass optical waveguide core formed on the cantilever beams, a plurality of optical waveguide fixed in opposition to the silica glass optical waveguide core, a cover for covering the cantilever beams, and a switch drive unit for bending the cantilever beams. The switch drive unit comprises electromagnetic actuators, which comprise soft magnetic bodies formed on the connection member for the cantilever beams and on the substrate, soft magnetic yokes formed of a soft magnetic body, permanent magnets, and wire coils.

15 Claims, 10 Drawing Sheets

FIG.9

| SWITCHED STATE OF ACTUATORS 38a AND 38b | SWITCHED STATE OF ACTUATORS 39a AND 39b | OUTPUT OPTICAL WAVEGUIDE CORE TO WHICH INPUT OPTICAL WAVEGUIDE CORE 30a IS CONNECTED | OUTPUT OPTICAL WAVEGUIDE CORE TO WHICH INPUT OPTICAL WAVEGUIDE CORE 30b IS CONNECTED |
|---|---|---|---|
| A | A | 32a | 32b |
| A | B | NONE | NONE |
| B | A | NONE | NONE |
| B | B | 32b | 32a |

OPTICAL SWITCH, METHOD OF MANUFACTURING SAME, AND OPTICAL COMMUNICATION EQUIPMENT USING THE SAME

BACKGROUND OF THE INVENTION

The present invention relates to a waveguide type optical switch that is employed in the field of optical communication, and more particularly to a waveguide type optical switch which is small in size and suitable for remote control.

Among conventional waveguide type optical switches is a 1×2 optical switch disclosed in Japanese Patent Unexamined Publication No. 6-148536. This 1×2 optical switch has a cantilever beam formed on a silicon substrate, and serves to perform optical path switching by moving an optical waveguide formed on the cantilever beam with the use of electrostatic force.

In the aforementioned optical switch the following points have not been taken into consideration.

First, the use of electrostatic force requires the drive volt is as high as tens of volts or more, and a single-cantilever beam structure for the optical switch involves turning of a tip end of the waveguide concurrently with translating motion at the time of optical switching operation, which causes non-parallelism of the optical entrance plane and optical exit plane of the waveguide, leading to an increased loss of insertion. In addition, a substrate is formed of silicon, and so if silica glass is used as a material for the optical waveguide, the waveguide will be distorted or cracked due to a difference between the linear expansion coefficients of the both components.

SUMMARY OF THE INVENTION

It is an object of the present invention to solve the above problems and provide a waveguide type optical switch which can be driven with a voltage of 10 volts or less and which is small in insertion loss and low in cost.

To achieve this end, an optical waveguide switch according to the present invention comprises a silica glass substrate; a plurality of cantilever beams formed in parallel to one another on the silica glass substrate, and connected at their tip ends to a connection member; at least one input silica glass optical waveguide core formed on the cantilever beams; a plurality of output optical waveguide cores fixed in opposition to the input silica glass optical waveguide core; and switch drive means for bending the cantilever beams.

Further, the invention provides an optical switch for switching an optical path of an input optical signal, comprising a silica glass substrate, a separation layer formed on the silica glass substrate, a plurality of cantilever beams formed in parallel to one another on the separation layer, and connected at their tip ends to a connection member, at least one input silica glass optical waveguide core formed on the cantilever beams, a plurality of output optical waveguide cores fixed in opposition to the input silica glass optical waveguide core, and switch drive means for bending the cantilever beams.

The thickness of the separation layer is less than a height of the input optical waveguide core, and at least one of the connection member or those members on the substrate which are disposed to be brought into contact with the connection member when an optical-path switching operation is performed are recessed in a movement direction of the connection member.

The switch drive means comprises soft magnetic bodies provided on the connection member for the cantilever beams and on the substrate, and an electromagnetic actuator comprising a soft magnetic yoke provided on the substrate and formed of a soft magnetic body, a permanent magnet, and a wire coil.

The soft magnetic yoke is divided to form an interior yoke formed of a soft magnetic body, and an exterior yoke formed of a soft magnetic body and opposed to the interior yoke through a cover formed with an insertion hole for an index regulating liquid.

With the above arrangement, a plurality of cantilever beams formed in parallel to one another and connected at their tip ends to the connection member function to have their tip ends moved parallel with one another when an optical-path switching operation is performed.

Therefore, the tip end portions of the optical waveguides formed on the cantilever beams are also moved parallel with one another upon the optical-path switching operation. This parallel movement of the optical waveguides makes selection of an output optical waveguide to enable optical path switching.

In the present invention, the silica glass optical waveguides are formed on a silica glass substrate, which can make the difference in liner expansion coefficient between the substrate and the optical waveguide layer extremely small, and consequently it is possible to suppress warp and deformation of the substrate and cantilever beams to accurately position the optical waveguides on the emergent and incident sides.

In the present invention, the separation layer provided on the whole or part of the silica glass substrate is removed by etching, and so movable cantilever beams separated from the substrate can be obtained with ease and in a short time.

In the present invention, a press member fixed to the substrate crosses at least one of the tip ends of the cantilever beams, and so there is no possibility that the cantilever beams will be separated from the substrate in a vertical direction.

In the present invention, the cover for covering the whole of cantilever beams allows an index regulating liquid to fill around the cantilever beams and their vicinities and eliminates the possibility of adherence of foreign matters which may hinder a switching operation, and so high reliable switching can be performed.

In the present invention, the thickness of the separation layer is less than the height of the optical waveguide, and so even if there were any positional discrepancy equivalent to the gap between the silica glass substrate and the cantilever beam after removal of the separation layer, there would be no possibility that the ends of the facing optical waveguides were completely displaced from each other and therefore the optical coupling would be maintained. Accordingly, even in the case where the cantilever beam is displaced by external disturbance, an extreme reduction in the optical coupling efficiency can be suppressed.

In the present invention, at least one of the connection member or those members on the substrate which are disposed to be brought into contact with the connection member when an optical-path switching operation is performed are recessed in a movement direction of the connection member to thereby limit the contact area to a small magnitude. Furthermore, it is possible to suppress the index regulating liquid from entering portions, with which the connection member and the aforementioned member on the substrate contact, to form a gap therebetween.

In the present invention, magnetic forces are generated between the soft magnetic body formed on the connection member for cantilever beams and above the substrate, and wire coils and the permanent magnet, and can be utilized to deform the cantilever beam to thereby switch the optical waveguide formed on the cantilever beam.

Further, in the present invention, the soft magnetic yoke formed of a soft magnetic body and constituting a part of a magnetic circuit can be divided to provide an interior yoke formed of a soft magnetic body and provided on the substrate, and an exterior yoke formed of a soft magnetic body and opposed to the interior yoke with the cover therebetween, so that it is possible to form only the interior yoke inside the cover enclosing the entire cantilever beam and the exterior yoke outside the cover. With this arrangement, the wire coil and the permanent magnet are not received within the cover, so the cover can be reduced in size and also foreign matters possibly produced from the permanent magnet and the wire coil can be prevented from adhering to the cantilever beam and their vicinities.

Further objects and advantages of the present invention will become apparent from the following detailed description when read in conjunction with the accompanying drawings.

BRIEF DESCRIPTION OF THE DRAWINGS

FIG. 9 is a diagram showing the relationship between the switched state of the 2×2 optical switch shown in FIG. 8 and the light coupled state.

DESCRIPTION OF THE PREFERRED EMBODIMENTS

Figure 1:
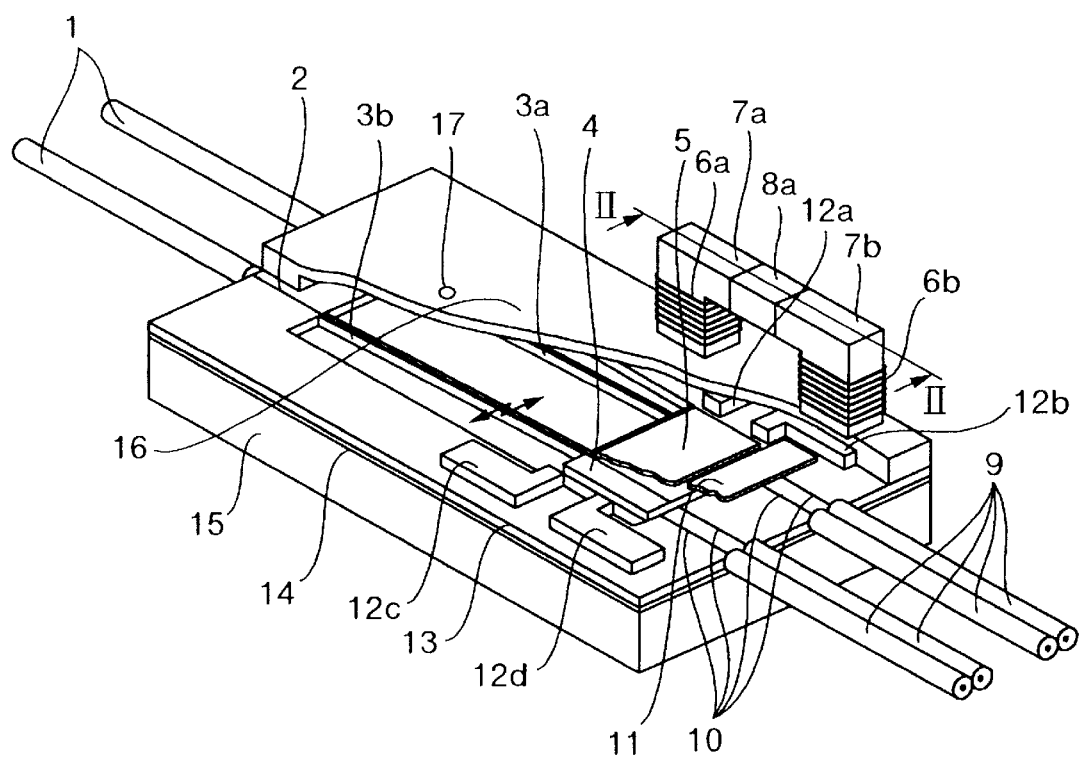
FIG. 1 is a fragmentary perspective view showing a embodiment of a waveguide type 2-circuit 1×2 optical switch according to the present invention.

Referring to FIG. 1, there is shown a fragmentary sectional perspective view of an embodiment of a waveguide type 2-circuit 1×2 optical switch according to the present invention. In this embodiment a silica glass waveguide layer 13 is formed on a silica glass substrate 15 through a separation layer 14. Movable optical waveguides 2 are formed on cantilever beams 3a and 3b, respectively. Formed on the free end sides of the cantilever beams 3a and 3b is a connection member 4, and formed on the upper surface of the connection member 4 is a soft magnetic film 5. Soft magnetic interior yokes 12a, 12b, 12c, and 12d are formed on the silica glass waveguide layer 13 at positions opposite to the connection member 4. A drive section consisting of wire coils 6a and 6b, soft magnetic exterior yokes 7a and 7b, and a permanent magnet 8a is formed above the interior yokes 12a, 12b, 12c, and 12d through a silica glass cover 16. Formed on the free end sides of the aforementioned movable optical waveguides 2 are a plurality of stationary optical waveguides 10 so that they are opposed according to the movement quantities of the movable optical waveguides 2. The free end sides of the movable optical waveguides 2 is prevented by a press member 11 from floating. The silica glass cover 16 is provided with an index regulating liquid filler hole 17 so that grooves for receiving the aforementioned cantilever beams can be filled with an index regulating liquid. The optical switch of this embodiment is constructed so that input optical fibers 1 can be connected to the input sides of the movable optical waveguides 2 and that output optical fibers 9 can be connected to the output sides of the stationary optical waveguides 10.

Now, the operation of the aforementioned optical switch will be described.

Light beams entering from the input optical fibers 1 are transmitted to the movable optical waveguides 2 formed on the cantilever beams 3a and 3b. The underlying separation layer 14 of the cantilever beams 3a and 3b is removed and also the tip ends of the cantilever beams 3a and 3b are connected to the connection member 4, so the cantilever beams 3a and 3b can be displaced over the silica glass substrate 15 while being maintained parallel with each other. The soft magnetic film 5 is formed on the connection member 4. Also, the soft magnetic interior yokes 12a, 12b, 12c, and 12d are formed on the silica glass waveguide layer 13 on the opposite sides of the soft magnetic film 5. The exterior yokes 7a and 7b, the permanent magnet 8a, and the wire coils 6a and 6b constitute an electromagnetic actuator, which is provided above the interior yokes 12a and 12b with the silica glass cover 16 therebetween. The wire coils 6a and 6b are supplied with electric power from a power supply (not shown). The voltage can be set between 3 volts and 10 volts.

In FIG. 1, although only the electromagnetic actuator above the interior yokes 12a and 12b is shown, a similar electromagnetic actuator is also formed above the interior yokes 12c and 12d. In FIG. 1, a portion of the soft magnetic film 5, a portion of the silica glass cover 16, and the other electromagnetic actuator have been removed to give a better understanding of the interior structure. If the direction of current flowing through the wire coils 6a and 6b is changed, the magnetic force that the permanent magnet 8a gives to the soft magnetic film 5 through the exterior yokes 7a and 7b and the interior yokes 12a and 12b will be increased or decreased, thereby performing the magnetic attraction or release of the tip end of each cantilever beam formed on the connection member 4. In this way, the electromagnetic actuator above the interior yokes 12a and 12b can be operated. The other electromagnetic actuator (not shown) above the interior yokes 12c and 12d can also be operated in a similar way. Therefore, the movable optical waveguide 2 can be switched to either one or the other of the stationary optical waveguides 10. Although not shown, index regulating liquid is introduced through an index regulating liquid filler hole 17 provided in the silica glass cover 16 and then fills the optical switching portion, whereby the reflection loss or scattering loss at the optical switching portion can be reduced.

Furthermore, in FIG. 1, two input optical fibers 1 are provided and a total of four output optical fibers 9 are connected two by two for each input optical fiber 1. If two output optical fibers 9 are provided for one input optical fiber 1, a 1×2 optical switch can be constituted. Also, the number of cantilever beams may also be 2 or more, and for example, if 12 cantilever beams 3 (on which input optical fibers 1 are formed) are formed, an interlocking 12-circuit 1×2 optical switch can be constituted.

Figure 2:
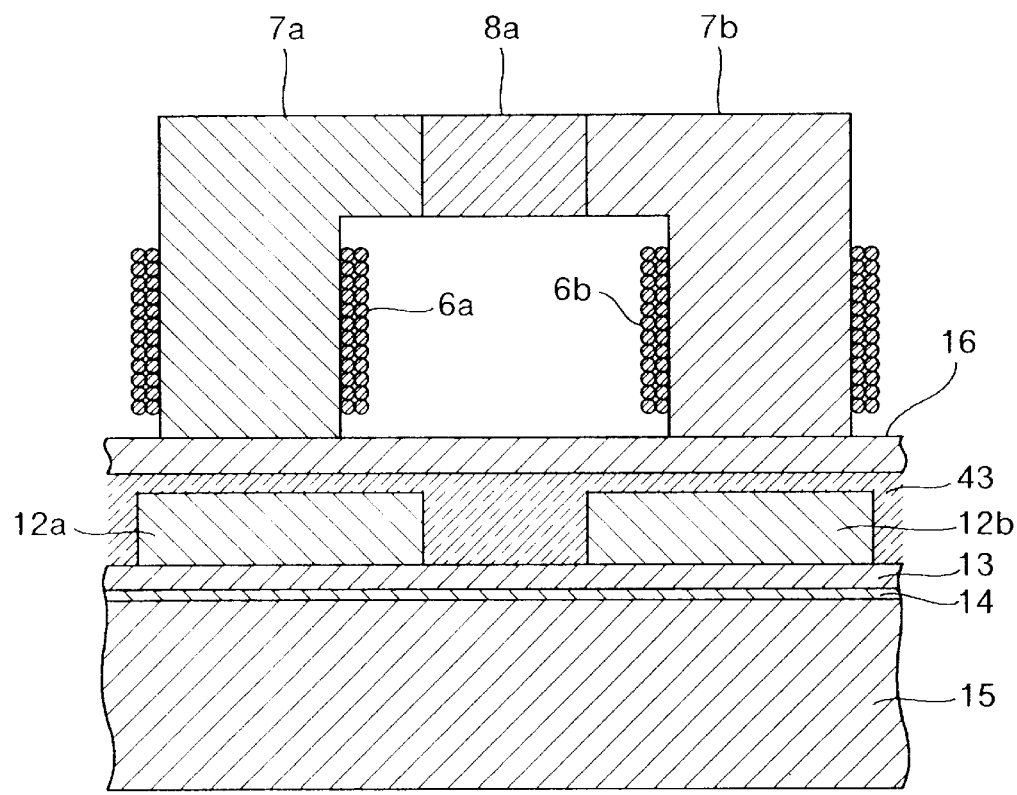
FIG. 2 is a sectional view showing an actuator for driving the waveguide type 2-circuit 1×2 optical switch according to the present invention.

FIG. 2 shows an actuator for driving the waveguide type 2-circuit 1×2 optical switch according to the present invention and is a sectional view taken substantially along line II—II of FIG. 1.

As shown in FIG. 2, the soft magnetic interior yokes 12a and 12b are formed on the silica glass waveguide layer 13. The exterior yokes 7a and 7b, the permanent magnet 8a, and the wire coils 6a and 6b are formed with the silica glass cover 16 between the yokes and them. Although the exterior yokes 7a and 7b are separated from the interior yokes 12a and 12b through the silica glass cover 16, an area where the yokes 7a and 7b and the yokes 12a and 12b face is larger than a gap between the yokes 7a and 12a or between the yokes 7b and 12b, so magnetic forces enough to produce forces necessary for a switching operation can be transmitted. In FIG. 2, gaps are also provided between the interior yoke 12a and the silica glass cover 16 and between the interior yoke 12b and the silica glass cover 16, but they can be contacted with each other without any gaps therebetween so that current flowing through the wire coils 6a and 6b to produce forces necessary for a switching operation can be reduced.

In this case, however, in order to make the lower surface of the silica glass cover 16 flush with the heights of the interior yokes 12a and 12b, there is the need to manage the working and assembling precision of the interior yokes 12a and 12b and the silica glass cover 16 with a high degree of accuracy. The wire coils 6a and 6b are interconnected to each other, so they are formed with a single continuous wire. If current flows between the respective terminal ends of the wire coils 6a and 6b, they will produce magnetic fields in the same direction within a magnetic circuit constituted by the exterior yokes 7a and 7b and the permanent magnet 8a. If the magnetic fields are strengthened by the permanent magnet 8a, strong magnetic forces will be applied to the interior yokes 12a and 12b. Conversely, if the magnetic fields and the permanent magnet 8 cancel out each other, almost no magnetic force will be applied to the interior yokes 12a and 12b. That is, if the direction of current is changed, the aforementioned magnetic circuit is allowed to serve as an electromagnetic actuator which performs a magnetic attraction operation and a non-magnetic attraction or release operation. In FIG. 2, the gap between the interior yokes 12a and 12b and the silica glass cover 16 is filled with the index regulating liquid 43.

Figure 3:
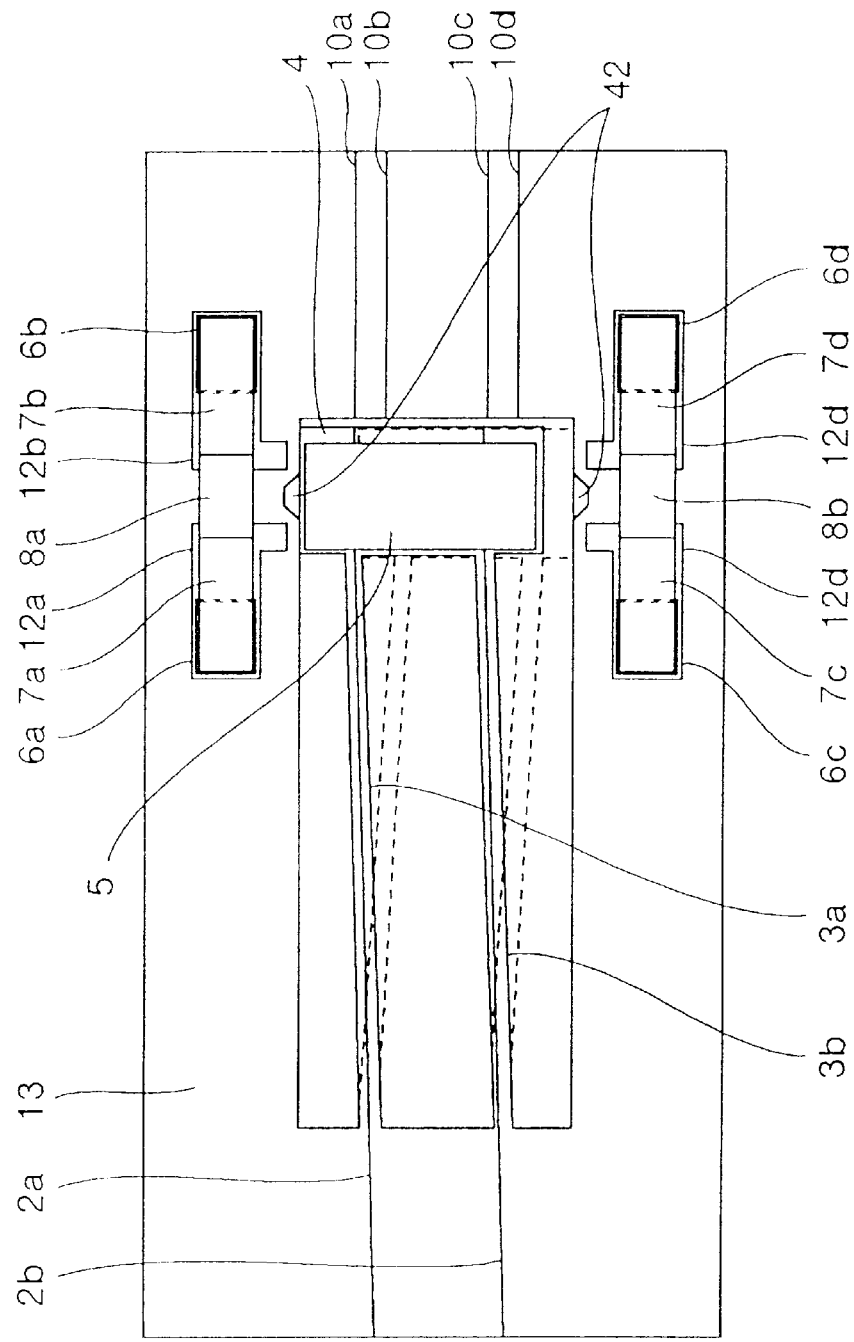
FIG. 3 is a plan view showing a second embodiment of a waveguide type 2-circuit 1×2 optical switch according to the present invention.

FIG. 3 shows a top plan view of an embodiment of a waveguide type 2-circuit 1×2 optical switch according to the present invention with the cover and optical fibers omitted.

The reference numerals 2a and 2b denote movable optical waveguides. A permanent magnet 8a is arranged on the side of the movable optical waveguide 2a. Stationary optical waveguides are denoted by the reference numerals 10a, 10b, 10c, and 10d. Wire coils 6c and 6d are arranged on the side of the movable optical waveguide 2b. Exterior yokes 7c and 7d are arranged on the side of the movable optical waveguide 2b. The reference numerals 8b and 42 denote permanent magnets arranged on the movable optical fiber 2b and a recess, respectively.

If current flows through the wire coils 6a and 6b in a direction to strengthen magnetic forces, with which the permanent magnet 8a attracts a soft magnetic film 5 magnetically through the exterior yokes 7a and 7b and the interior yokes 12a and 12b and current flows through the wire coils 6c and 6d in a direction (hereinafter referred to as an A direction) to weaken magnetic forces, with which the permanent magnet 8a attracts the soft magnetic film 5 magnetically through the exterior yokes 7c and 7d and the interior yokes 12c and 12d, then cantilever beams 3a and 3b will be magnetically attracted by and displaced toward the permanent magnet 8a, as shown by solid lines. Consequently, the movable optical waveguides 2a and 2b are connected to the stationary optical waveguides 10a and 10c, respectively. If, on the other hand, current flows through the wire coils 6a, 6b, 6c, and 6d in the opposite direction (hereinafter referred to as a B direction), the direction in which force is applied to the soft magnetic film 5 will be reversed and the cantilever beams 3a and 3b will be displaced as shown by broken lines. Consequently, the movable optical waveguides 2a and 2b are connected to the stationary optical waveguides 10b and 10d, respectively.

Thus, optical path switching can be realized with the above arrangement. Since the tip ends of the cantilever beams 3a and 3b and the tip ends of the movable optical waveguides 2a and 2b are connected to the connection member 4, the movable optical waveguides 2a and 2b extending beyond the connection member 4 are moved parallel with each other upon the optical-path switching operation in accordance with the principles of a parallel plate spring.

Even after the cantilever beams 3a and 3b have been switched to positions indicated by solid lines and then the current flowing through the wire coils 6a, 6b, 6c, and 6d has been shut off, the permanent magnet 8a attracts the soft magnetic film 5 magnetically through the exterior yokes 7a and 7b and the interior yokes 12a and 12b, so there is no possibility that the cantilever beams 3a and 3b will be moved from the positions indicated by solid lines. Since the silica glass waveguide layer 13 is provided with recesses 42 at positions where the waveguide layer 13 is contacted by the connection member 4, the contact area between the connection member 4 and the silica glass waveguide layer 13 can be reduced, so that in the case where the optical switch is immersed in the index regulating liquid, the liquid is suppressed from entering between the contacting portions to form gaps. Thus, the offset and inclination of the optical axis can be reduced when optical path switching is performed.

The aforementioned arrangement, therefore, can realize a self holding type optical switch, in which the light attenuation on an optical path switching interface, dependent upon the inclination of an optical axis, is small.

Figure 4:
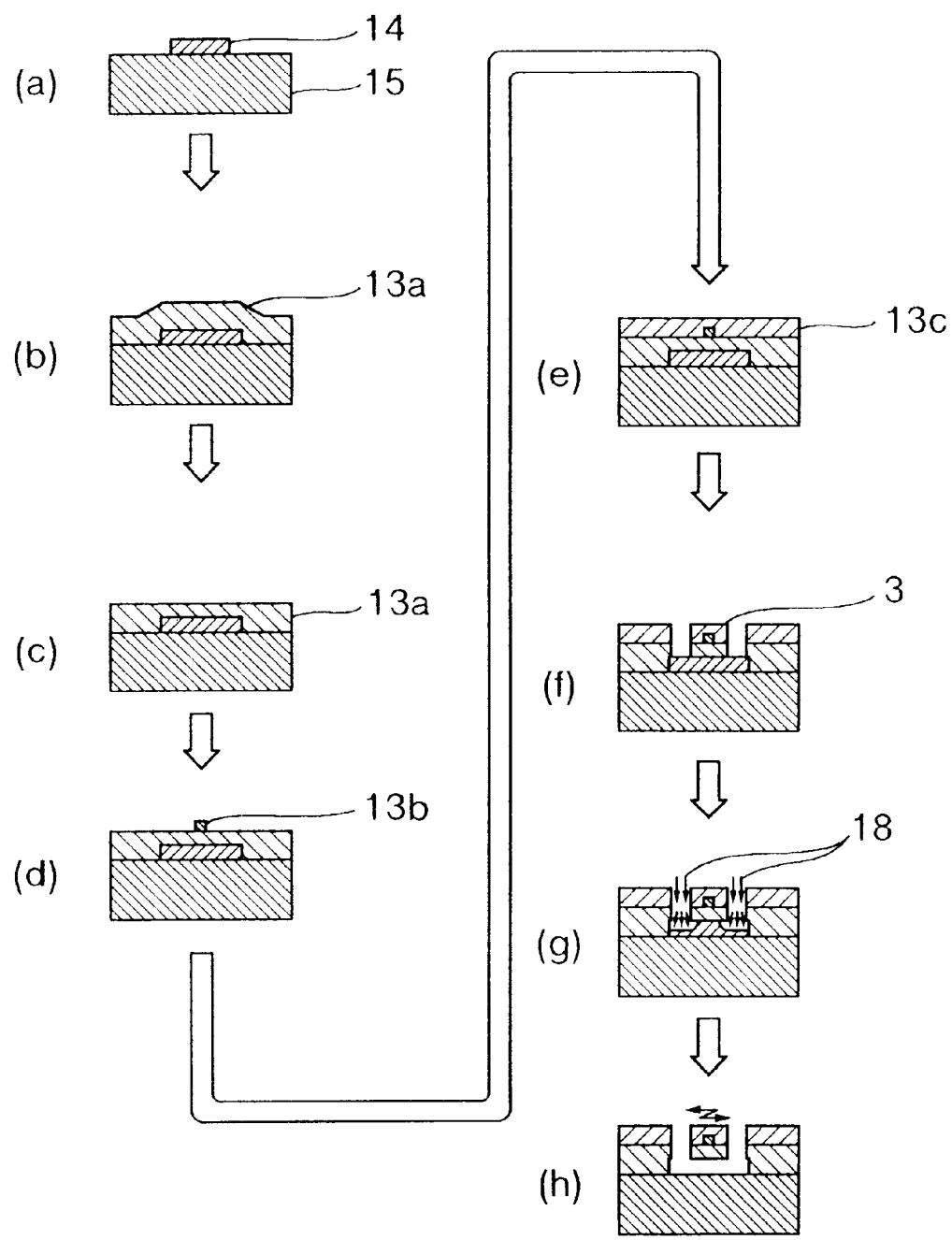
FIG. 4 is a schematic, cross sectional view showing a process, in which a cantilever beam is separated from a silica glass substrate.

FIG. 4 schematically shows in cross section how the cantilever beam is separated from the silica glass substrate.

In the figure, the reference numeral 3 denotes a cantilever beam, 14 a partially formed silicon separation layer, 13a a silica glass buffer layer, 13b a silica glass waveguide core, 13c a silica glass clad layer, and 18 a silicon etchant.

First, in FIG. 4(a), the silicon separation layer 14 with a thickness of 2 $\mu$m is partially formed on a silica glass substrate 15. The separation layer 14 may be formed by a film formation method such as sputter deposition, vapor deposition, chemical vapor deposition, or ion beam lithography. A method of joining a previously prepared silicon plate to the silica glass substrate 15 may also be employed.

Then, in FIG. 4(b), the silica glass buffer layer 13a with a thickness of 25 μm is formed to cover the separation layer 14 and the silica glass substrate 15. The silica glass buffer layer 13a is formed by a film formation method such as sputter deposition, vapor deposition, flame deposition, chemical vapor deposition, or ion beam lithography. Formed on the surface of the silica glass buffer layer 13a is a protruding portion due to the presence of the separation layer 14.

Then, in FIG. 4(c), the aforementioned protruding portion formed on the surface of the silica glass buffer layer 13a is removed by polishing and leveled.

Then, in FIG. 4(d), the silica glass waveguide core 13b with a height of 8 μm and a width of 8 μm is formed on the silica glass buffer layer 13a. The silica glass waveguide core 13b is formed by a film formation method, such as sputter deposition, vapor deposition, chemical vapor deposition, or ion beam lithography, or it is formed by joining a previously prepared silica plate to the silica glass buffer 13a and etching a portion other than a portion which becomes the silica glass waveguide core 13b.

Then, in FIG. 4(e), the silica glass clad layer 13c with a thickness of 25 μm is formed to cover the silica glass buffer layer 13a and the silica glass waveguide core 13b. The clad layer 13c can be formed by flame deposition. In addition, another film formation method, such as sputter deposition, vapor deposition, chemical vapor deposition, or ion beam lithography, may be employed. Furthermore, since the surface of the clad layer 13c bulges out above the silica glass waveguide core 13b, polishing will be performed if a flat surface is required. In this embodiment, FIG. 4(e) shows a state in which polishing has been performed.

Then, in FIG. 4(f), the silica glass buffer layer 13a and the silica glass clad layer 13c are removed along the external form of the cantilever beam 3. While wet chemical etching and dry etching can be applied, this embodiment employs dry etching whose etch rate is generally anisotropic.

Then, in FIG. 4(g), the separation layer 14 is etched. While wet chemical etching and dry etching can be applied, in this embodiment the separation layer 14 is etched in a silicon etchant 18. FIG. 4(g) shows a state in which etching has advanced halfway.

FIG. 4(h) shows a state in which etching has been completed. The underlying separation layer 14 of the cantilever beam 3 is removed by etching, so the cantilever beam 3 can move away from the silica glass substrate 15.

In this embodiment, while the silicon separation layer 14 is formed on the silica glass substrate 15, the cantilever beam 3 could be similarly separated from the silica glass substrate 15, even if a separation layer consisting of titanium or platinum having a higher melting point than 1360° C. and better etching performance or consisting of a combination of these were employed instead of silicon. Furthermore, in this embodiment, while the separation layer 14 has a thickness of 2 μm, if the thickness is less than the height of the silica glass waveguide core 13b, there will be no possibility that optical coupling will be lost between the silica glass waveguides because even if the cantilever beam 3 falls in the space from which the separation layer 14 was removed, an overlapped portion between the ends of the silica glass waveguides will still be present. Note in FIG. 4 that the thickness of the separation layer 14 is shown on an enlarged scale to give a better understanding of the separated state of the separation layer 11.

In this embodiment, while the separation layer 14 is completely removed, a portion thereof may remain if the cantilever beam 3 is separated from the silica glass substrate 15. In addition, if the separation layer 14 is formed over the entire surface of the silica glass substrate 15, then polishing can be omitted between the steps shown in FIGS. 14(b) and 14(c).

Figure 5:
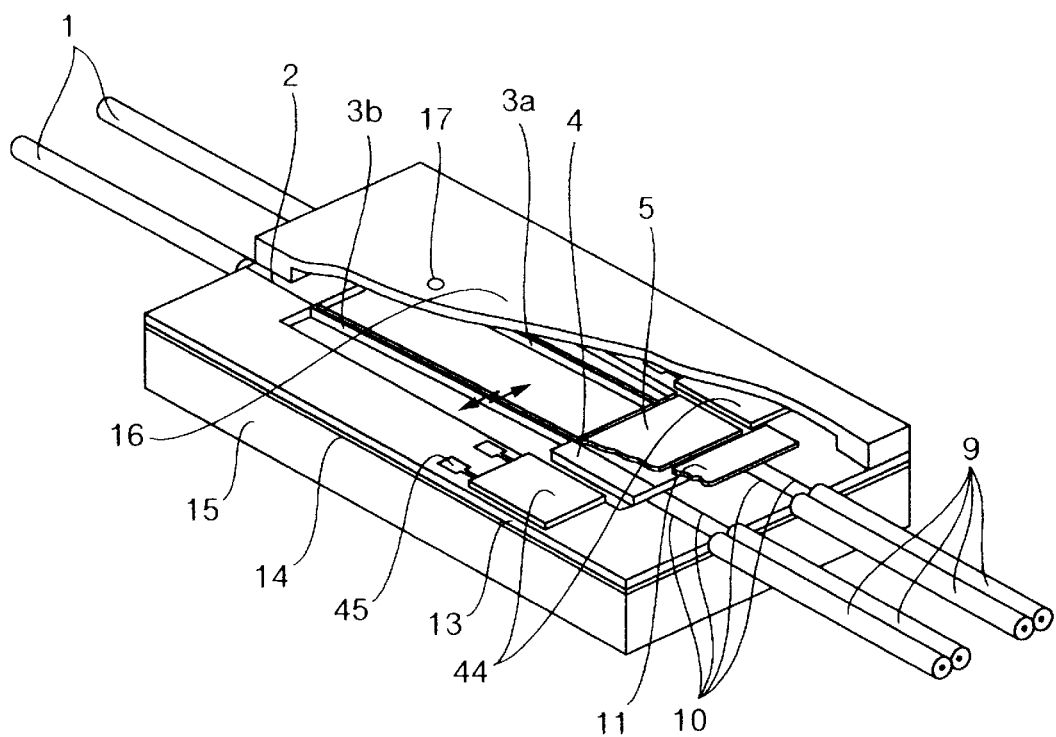
FIG. 5 is a fragmentary perspective view of a third embodiment of a waveguide type 2-circuit 1×2 optical switch according to the present invention.

FIG. 5 shows a fragmentary perspective view of another embodiment of a waveguide type 2-circuit 1×2 optical switch according to the present invention.

A difference between this embodiment and the embodiment shown in FIG. 1 is that the actuator shown in FIG. 2 is replaced with an actuator 44 and an actuator electrode 45.

The actuator 44 and the actuator electrode 45 in this embodiment are formed on a silica glass waveguide layer 13 by a photolithographic process. If cantilever beams, including the actuator 44 and the actuator electrode 45, are covered with a silica glass cover 16, optical switch miniaturization will be possible.

Figure 6:
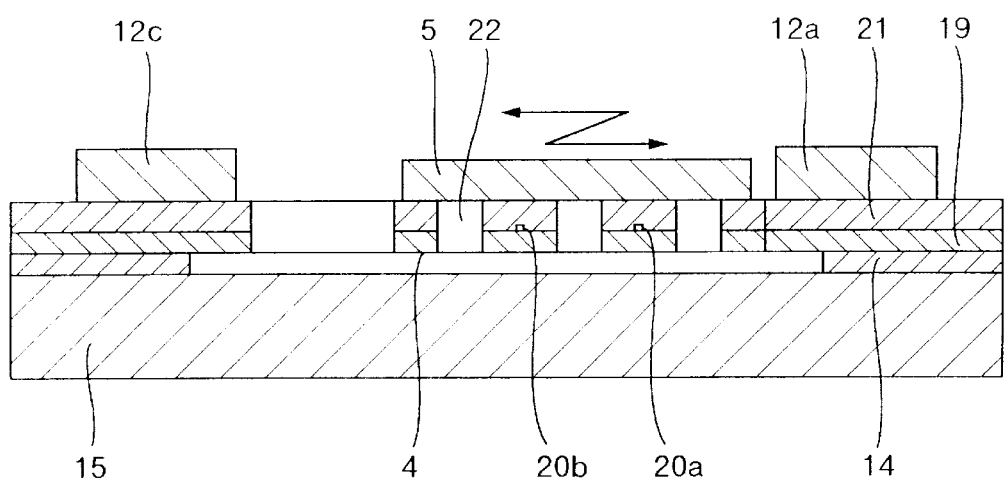
FIG. 6 is a cross sectional view of the waveguide type 2-circuit 1×2 optical switch shown in FIG. 2.

FIG. 6 shows a cross sectional view of the waveguide type 2-circuit 1×2 optical switch shown in FIG. 1, including the interior yokes 12a and 12c. In FIG. 6, the silica glass cover, exterior yokes, wire coils, and the permanent magnet are omitted. Since the silica glass buffer layer 19 and the silica glass clad layer 21 contact with each other, the movable optical waveguide cores 20a and 20b are positioned with a high degree of accuracy and optical connection can be achieved with high efficiency.

Figure 7:
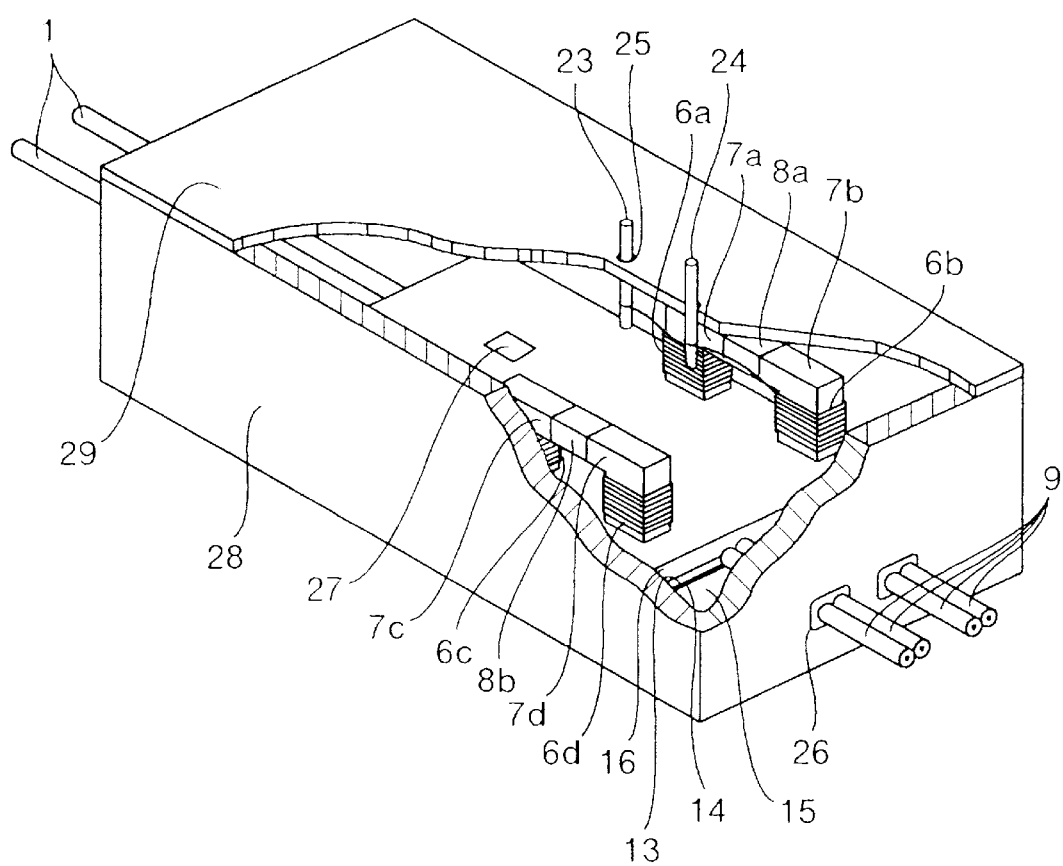
FIG. 7 is a fragmentary perspective view showing an optical switch enclosed in a package.

FIG. 7 shows a fragmentary perspective view of an optical switch mounted in a package with a portion of its cover removed.

The reference numerals 23 and 24 denote electrode pins, and 25 and 26 denote seal members. The reference numeral 27 denotes an index matching filler hole cover, 28 a casing, and 29 a casing cover.

The optical switch is filled with an index regulating liquid through an index regulating liquid filler hole (not shown) provided in a cover 16 present under the index regulating liquid filler cover 27 and then the index regulating liquid filler cover 27 covering the index regulating liquid filler hole is joined to the cover 16 to hermetically seal the optical switch. The optical switch is also covered with the casing 28 and the casing cover 29 which has the electrode pins 23 and 24 attached thereto by the seal member 25. The electrode pin 23 is connected electrically to a wire coil 6a, and the electrode pin 24 is connected electrically to a wire coil 6b. A portion of the casing cover 29 is omitted to show the interior structure, and in the omitted portion, similar electrode pins to the electrode pins 23 and 24 are mounted by the seal member 25 and they are connected electrically to wire coils 6c and 6d. The wire coils 6c and 6d may be connected to the electrode pins 23 and 24 in stead of being connected to the pins (omitted) similar to the electrode pins 23 and 24. Portions of the casing 28, through which output optical fibers 9 extend, are sealed hermetically by the seal members 26. Being concealed behind the casing 28 and so not shown in FIG. 7, those portions of the casing 28, through which the input optical fibers 1 extend, are also sealed hermetically in the same way by the seal members 26.

The cover 16 and the index regulating liquid filler hole cover 27 are joined together with an adhesive agent, but in the case where the material of the index regulating liquid filler hole cover 27 is silica glass, they may be welded together by local heating.

Since the portions where optical switching is performed is sealed hermetically by the silica glass cover 16 and the index regulating liquid filler hole cover 27, an entry of foreign matters causative of operational failure or an entry of oxygen into air or water causative of corrosion and deterioration can be prevented. In addition, the silica glass substrate 15, separation layer 14, silica glass waveguide layer 13, silica glass cover 16, index regulating liquid filler hole cover 27, wire coils 6a, 6b, 6c, and 6d, exterior yokes 7a, 7b, 7c, and 7d, and the permanent magnets 8a and 8b are sealed hermetically by the casing 28 and the casing cover 29, so an entry of oxygen into air or water causative of corrosion and deterioration can be prevented, and in the case where external force is applied, it can be prevented from directly reaching glass components such as the silica glass substrate 15, silica glass waveguide layer 13, and the silica glass cover 16. As a consequence, an optical switch can be constituted with high reliability.

Figure 8:
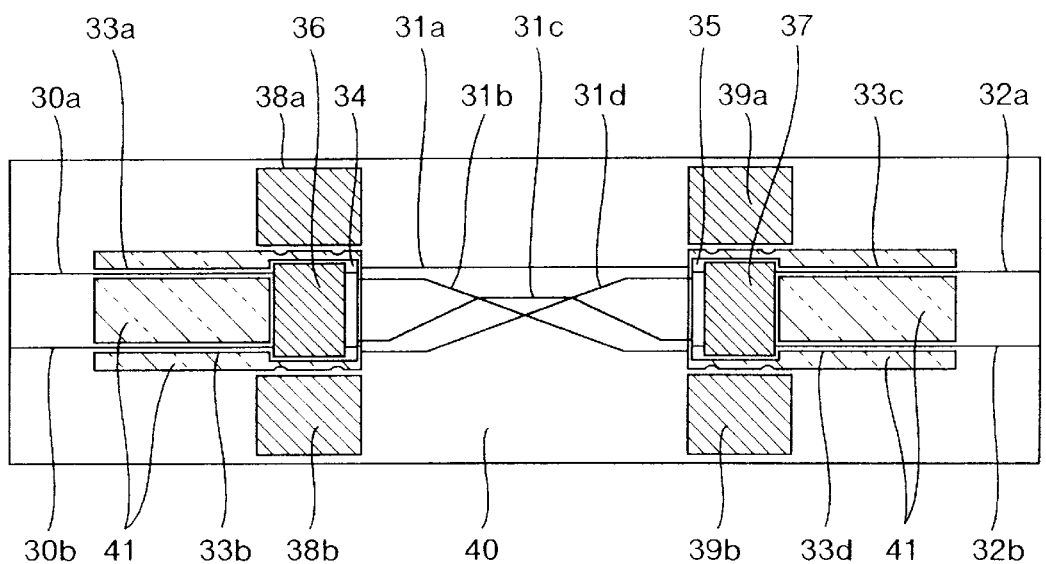
FIG. 8 is a plan view showing an embodiment, in which the waveguide type optical switch according to the present invention is applied to a 2×2 optical switch.

FIG. 8 shows an embodiment in which the waveguide type optical switch according to the present invention is applied to a 2×2 optical switch.

The reference numerals 30a and 30b denote input optical waveguide cores and 31a, 31b, 31c, and 31d denote intermediate optical waveguide cores for connecting optical switches together. The reference numerals 32a and 32b are output optical waveguide cores, 33a, 33b, 33c, and 33d cantilever beams, 34 and 35 connection members, 36 and 37 soft magnetic films, and 38a, 38b, 39a, and 39b electromagnetic actuators. The reference numeral 40 denotes a silica glass layer and 41 a silica glass substrate forming a separation layer.

The underlying layers of the cantilever beams 33a, 33b, 33c, and 33d and underlying separation layers of the connection members 34 and 35 are removed by etching, so the cantilever beams 33a, 33b, 33c, and 33d can be bent by operations of the electromagnetic actuators 38a, 38b, 39a, and 39b. If actuation of the electromagnetic actuators 38a and 38b cause the cantilever beams 33a and 33b to bend to switch light beam passing the input optical waveguide core 30a to the side of the electromagnetic actuator 38a or 38b, to thereby be connected to the intermediate optical waveguide core 31a or 31b and the intermediate optical waveguide core 31c or 31d, formed in the silica glass layer 40 formed on the silica glass substrate 41 forming a separation layer.

Next, actuation of the electromagnetic actuators 39a and 39b cause the cantilever beams 33c and 33d to bend to switch the light beam passing these optical waveguide cores to the side of the electromagnetic actuator 39a or 39b, and so the output optical waveguide core 32a and the output optical waveguide core 32b will be connected to the intermediate optical waveguide core 31a or 31d, and the intermediate optical waveguide core 31b or 31c. In this way, 2×2 optical switching is performed.

FIG. 9 shows the relationship between the switched state of the 2×2 optical switch shown in FIG. 8 and the light coupled state.

Let "A" be a state of the optical switch switched to the side of the actuators 38a and 39a shown in FIG. 8 and "B" a state of the optical switch switched to the side of the actuators 38b and 39b shown in FIG. 8. Also, four switched states can be set by placing the cantilever beams 33a and 33 in the switched state "A" or "B" and placing the cantilever beams 33c and 33d in the switched state "A" or "B". In this respect, 2×2 switched states can be realized by switching the cantilever beams 33a and 33b or the cantilever beams 33c and 33d to two switched position A or B. When the switched states A and B are present in combination, there are produced waveguides which are not connected, but this can be prevented by interlocking the operations of the electromagnetic actuators 38a, 38b, 39a, and 39b.

In this manner, if two waveguide type 2-circuit 1× 2 optical switches according to the present invention are made to face each other and combined together, a 2×2 optical switch can be realized.

Figure 10:
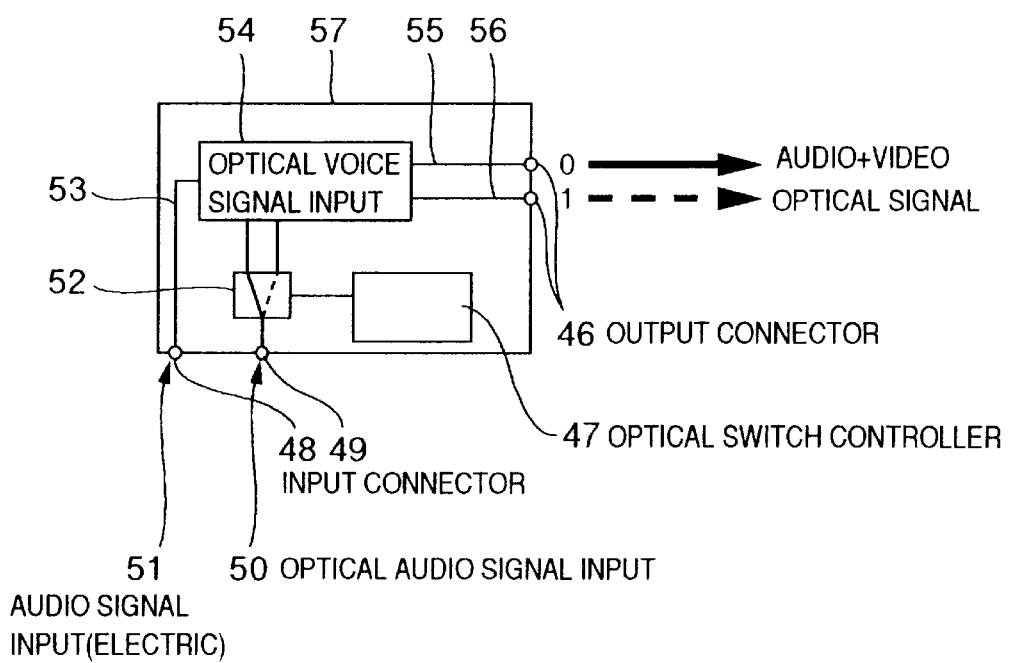
FIG. 10 is a block diagram showing an embodiment in which the waveguide type optical switch according to the present invention is applied to an optical communication equipment.

FIG. 10 shows an embodiment in which the waveguide type optical switch according to the present invention is applied to optical communication equipment.

The reference numeral 46 is an output terminal, 47 an optical switch controller, 48 an electric signal input terminal for an electric voice signal, 49 an optical signal input terminal for an optical video signal, 50 an optical video signal, 51 an electric voice signal, 52 an optical switch, 53 an electric voice signal cable, 54 an electro-optical signal converter, 55 a 0-system optical fiber, 56 a 1-system optical fiber, and 57 a housing.

In the optical communication equipment of this embodiment, the optical video signal 50 is input into the optical signal input terminal 49, and the input signal allows the optical switch 52 to select a terminal, through which it is input to the electro-optical signal converter 54. Generally, optical communication networks perform duplex communication for ensuring a reliable network and therefore comprise 0-system and 1-system optical fibers. An audio electric signal is switched electrically to a 0 system or a 1 system. Since a video signal is input as an optical signal, it is switched to a 0 system or a 1 system by the optical switch 52. In this way, if one optical fiber fails, communication can be kept with the other optical fiber. The electro-optical signal converter 54 converts the audio electric signal 51 input from the electric signal input terminal 48 to an optical signal and synthesizes the optical signal with an optical video signal input from the optical signal input terminal 49. The synthesized signal is output from the output terminal 46 through the 0-system optical fiber 55 or the 1-system optical fiber 56. It is to be noted that if an error in the optical signal output from the output terminal is detected by a detector (not shown), then the error will be input to the switch controller 47, and the optical switch 52 will be switched to the other normal transmission line.

The optical switch in this embodiment comprises the aforementioned optical switch. Thus, if the optical switch of the present invention is applied to an optical communication equipment, equipment miniaturization and equipment with high reliability can be realized.

According to the present invention, it becomes possible to realize an optical switch which can be driven with a low voltage of less than 10 volts and which is small in insertion loss and low in cost.

While the present invention has been described with reference to preferred embodiments thereof, the invention is not to be limited to the details given herein, but may be modified within the scope of the appended claims

What is claimed is:

1. An optical switch for switching an optical path of an input optical signal, comprising:

a silica glass substrate;

a plurality of cantilever beams formed in parallel to one another and floating above said silica glass substrate, and connected at their tip ends to a connection member, said cantilever beams being equally bendable in opposite directions;

a plurality of input silica glass optical waveguide cores, respective ones of said input silica glass optical waveguide cores being formed on respective ones of said cantilever beams so that each of said cantilever beams has a respective one of said input optical waveguide cores formed thereon;

a plurality of output optical waveguide cores fixed in opposition to said input silica glass optical waveguide cores; and switch drive means for bending said cantilever beams from a position in one bent direction to a position in an opposite bent direction when an optical path switching operation is performed.

2. The optical switch as set forth in claim 1, wherein at least one of said connection member or those members on said substrate which are disposed to be brought into contact with said connection member when an optical-path switching operation is performed are recessed in a movement direction of said connection member.

3. The optical switch as set forth in claim 1, wherein said switch drive means comprises a soft magnetic body provided on said connection member, a soft magnetic yoke provided on said substrate and formed of a soft magnetic body, a permanent magnet, and a wire coil.

4. The optical waveguide switch as set forth in claim 3, wherein said soft magnetic yoke is constituted by an interior yoke and a soft magnetic exterior yoke opposed to said interior yoke through a cover.

5. The optical switch as set forth in claim 4, further comprising a casing with electrodes to be connected to said wire coils.

6. The optical switch as set forth in claim 1, further comprising a cover.

7. The optical switch as set forth in claim 6, wherein said cover is formed with an insertion hole for an index regulating liquid.

8. The optical switch as set forth in claim 6, wherein said switch drive means is provided outside a casing.

9. The optical switch as set forth in claim 1, wherein at least either of said connection member and those members on said substrate, which are disposed to be contacted by said connection member when an optical path switching operation is performed, are recessed on positioning surfaces thereof in a moving direction of said connection member.

10. The optical switch as set forth in claim 4, wherein said cover is formed with an insertion hole for an index regulating liquid.

11. The optical switch as set forth in claim 4, wherein said switch drive means is provided outside a casing.

12. The optical switch as set forth in claim 1, wherein said switch drive means comprises a soft magnetic body provided on said connection member, soft magnetic yoke means formed of a soft magnetic body and comprising interior soft magnetic yoke means provided on said substrate and exterior soft magnetic yoke means provided outside of said optical switch, a permanent magnet, and a drive magnetic coil, said interior soft magnetic yoke means and exterior soft magnetic yoke means being magnetically coupled to each other.

13. The optical switch as set forth in claim 12, wherein said interior yoke means and said soft magnetic exterior yoke means are opposed to each other with a cover therebetween.

14. The optical switch as set forth in claim 1, further comprising a cover, through which magnetic coupling is utilized to exert a drive power in the interior of said optical switch from outside said cover.

15. The optical switch as set forth in claim 1, wherein said plurality of output optical waveguide cores include a first and second core fixed in opposition to a respective one of said input silica glass optical waveguide cores on opposite sides with respect to an input end of said respective one of said input silica glass optical waveguide cores so that when effecting coupling of said respective one of said input silica glass optical waveguide cores to said first core of said plurality of output optical waveguide cores, a respective one of said cantilever beams extends in one bent direction when effecting coupling to said second core of said plurality of output optical waveguide cores, said respective one of said cantilever beams extends in an opposite bent direction.

* * * * *